Feb. 12, 1929.
A. MATTSON
1,702,216
WINDOW VENTILATOR FOR AUTOMOBILES
Filed March 14, 1927
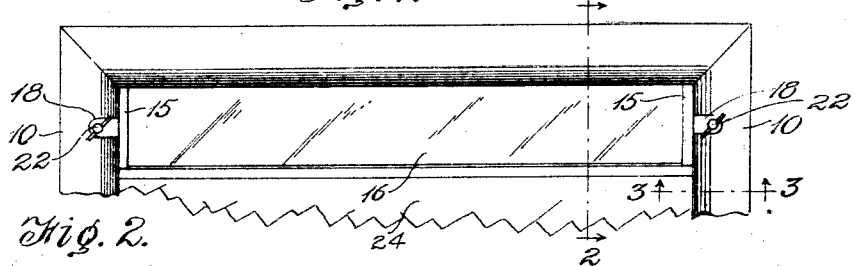
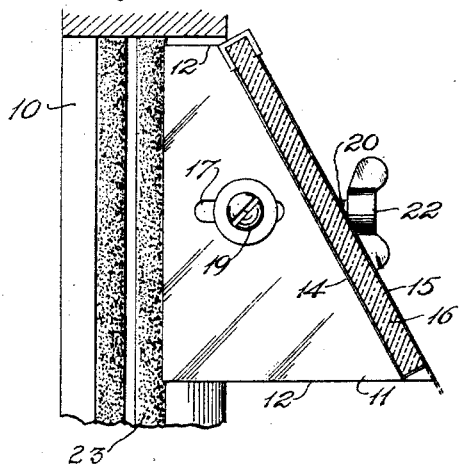
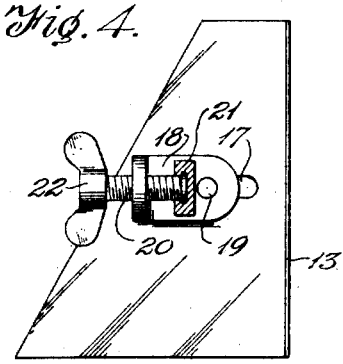
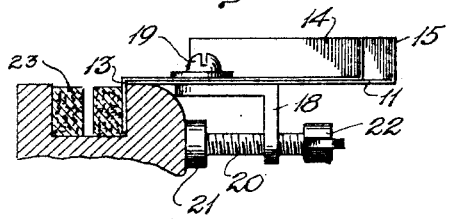
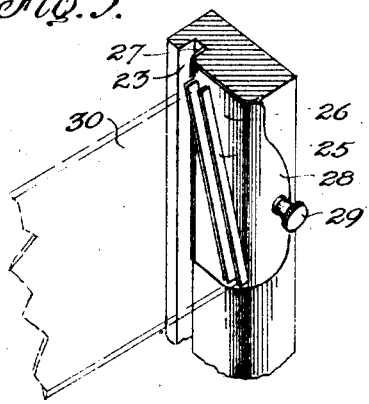
INVENTOR.
Anton Mattson
BY
ATTORNEY.

Patented Feb. 12, 1929.

1,702,216

UNITED STATES PATENT OFFICE.

ANTON MATTSON, OF MINNEAPOLIS, MINNESOTA.

WINDOW VENTILATOR FOR AUTOMOBILES.

Application filed March 14, 1927. Serial No. 175,209.

This invention relates to automobiles and has special reference to a ventilator for the doors and windows of an automobile which are provided with glass or sash which move down into pockets below the window opening in the door or body.

One important object of the invention is to provide an improved, simple and efficient device which can be applied to the side frames of any window openings in an automobile, and which when so applied supports a ventilator panel of glass or like in such manner that the glass or sash may be slid downwardly from its uppermost position and an air space be provided for the ventilator of the automobile without opportunity being afforded for the entrance of rain or the like and also without permitting a direct draft on the occupants of the vehicle.

A second important object of the invention is to provide an improved device of this character with an adjustable clamping means so arranged that the device can be affixed by the clamping means to the side of the window frame of substantially any make or type of closed automobile.

A third important object of the invention is to provide an improved device of this character capable of being cheaply manufactured and having its main or body portion formed from stampings of thin sheet metal suitably assembled.

With the above and other objects in view as will be hereinafter apparent, the invention consists in general of certain novel details of constructions and combinations of parts hereinafter fully described, illustrated in the accompanying drawings and specifically claimed.

In the accompanying drawings like characters of reference indicate like parts in the several views, and:

Figure 1 is a view from the outside of an automobile showing a portion of the upper part of a door with the invention in position.

Figure 2 is an enlarged section on the line 2—2 of Figure 1.

Figure 3 is a detail section enlarged on the line 3—3 of Figure 1.

Figure 4 is a view of the supporting bracket shown in Figure 2 but from the opposite side thereto.

Figure 5 is a perspective view showing a slightly modified form of the device.

In carrying out the invention there is provided a pair of brackets of like form, these brackets being right and left handed respectively in order to fit the right and left hand side members 10 of the window opening in the door or other part of the body of an automobile. Each of these brackets consists of what may be termed the outer or front member 11 having parallel upper and lower edges 12 and provided with a rear edge perpendicular to the edges 12 and bent to form a flange 13. The remaining edge of this member is inclined so that the upper edge 12 is much shorter than the lower edge 12 and a flange 14 is formed on this inclined edge and extends in the opposite direction to the flange 13. The other part of each body is similarly formed being somewhat less in width and has a flange 15 on its inclined edge only, the flanges 14 and 15 being spaced to provide a slot for the side edge of a glass panel 16. These two members are suitably secured together, preferably by spot welding. The flange 15 is made sufficiently long so that it may be bent over to close the bottom of the slot between said flange and the flange 14. These body members are preferably formed of thin cheap metal such as sheet steel of very light gage.

A transverse slot 17 extends through the body about midway its height and resting on the face of the second member is an L-shaped bracket 18, the bracket being held in adjusted position by a screw 19 passing through the slot and into one leg of said bracket. The remaining leg of the bracket extends at right angles to the body formed by the thin plates and through this remaining leg passes a suitable clamp screw 20 having clamping head 21 preferably in the form of a rubber pad so that when applied the finish of the automobile will not be injured. The clamping screw 20 is provided with a suitable head 22 for operation of the screw manually. In use the flange 13 is engaged in the guide slot 23 for the window glass 24 which normally closes the window and, being very thin, does not materially interfere with the operation of this window. The bracket 18, under these conditions, overhangs the side members 10 of the window opening and, by adjusting the screw 20 the device is clamped securely in the window frame.

The glass panel 16 is thus outwardly and downwardly inclined from the top of the window frame so that when the glass or sash 24 is moved downwardly ventilation space is left which is protected by the panel 16 so that rain or the like can not beat in and wind can not blow directly in over the top of the glass 24, it being understood that the top edge of the said glass under these conditions will not be dropped lower than the bottom edge of the bracket.

In the form shown in Figure 5 the L-shaped bracket is dispensed with and the body 26 has a rear flange 27 engaging a slot 23 and a front flange 28 wherethrough the adjusted screw 29 passes. Spaced ribs 25 are welded or otherwise suitably secured on the body to provide a channel or slot for the glass panel 30. The operation of this form is similar to that previously described.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. In a device of the kind described, a pair of opposed brackets each having a rear edge provided with a flange, a clamping screw carried by each bracket and operating in conjunction with the flange to form gripping means for the side of a window opening, and a guard panel carried by said brackets.

2. In a device of the kind described, a pair of opposed brackets each having a rear edge provided with a flange, a clamping screw carried by each bracket and operating in conjunction with the flange to form gripping means for the side of a window opening, spaced parallel flanges projecting from each bracket in a direction opposite the first flange to form a channel, and a guard panel having its ends engaged in said channels.

3. In a device of the kind described, a pair of opposed brackets each having one edge provided with a flange arranged to form one jaw of a clamp, a second clamping jaw adjustably mounted on each bracket, means to hold said last jaws in adjusted position, said second jaw including a clamping screw, and a guard panel supported by and extending between said brackets.

4. In a device of the kind described, a pair of opposed brackets each having one edge provided with a flange arranged to form one jaw of a clamp, a second clamping jaw adjustably mounted on each bracket, means to hold said last jaws in adjusted position, said second jaw including a clamping screw, spaced parallel flanges projecting from each bracket in a direction opposite the first flange to form a channel, and a guard panel having its ends engaged in said channels.

5. In a device of the kind described, a pair of opposed brackets each having a vertical edge provided with a flange adapted to engage the guide groove in the side of a window frame, an L-shaped member mounted on each bracket and having one leg projecting parallel to said flange, slot and screw means for adjustably securing said member on said bracket, a clamping screw passing through said leg of the member, and a guard panel supported by and extending between said brackets.

6. In a device of the kind described, a pair of opposed brackets each having a vertical edge provided with a flange adapted to engage the guide groove in the side of a window frame, an L-shaped member mounted on each bracket and having one leg projecting parallel to said flange, slot and screw means for adjustably securing said member on said bracket, a clamping screw passing through said leg of the member, spaced parallel flanges projecting from each bracket in a direction opposite the first flange to form a channel, and a guard panel having its ends engaged in said channels.

7. In a device of the kind described, a pair of opposed brackets each having one edge provided with a flange arranged to form one jaw of a clamp, a second clamping jaw adjustably mounted on each bracket, means to hold said last jaws in adjusted position, said second jaw including a clamping screw, spaced parallel flanges projecting from each bracket in a direction opposite the first flange to form a channel, and a guard panel having its ends engaged in said channels, said last mentioned flanges being arranged on the edges of each bracket opposite the first flange.

8. In a device of the kind described, a pair of opposed brackets each having a vertical edge provided with a flange adapted to engage the guide groove in the side of a window frame, an L-shaped member mounted on each bracket and having one leg projecting parallel to said flange, slot and screw means for adjustably securing said member on said bracket, a clamping screw passing through said leg of the member, spaced parallel flanges projecting from each bracket in a direction opposite the first flange to form a channel, and a guard panel having its ends engaged in said channels, said last mentioned flanges being arranged on the edges of each bracket opposite the first flange.

9. In a device of the kind described, a bracket formed of two sheet metal members each of which has a vertical and an inclined edge, one of said members having oppositely directed flanges on said edges and the other member having a flange on its inclined edge, said members being secured together to leave the flanges of the inclined edges in spaced parallel relation, and clamping means carried by the bracket on the same side as the flange on the vertical edge and cooperating therewith.

10. In a device of the kind described, a bracket formed of two sheet metal members each of which has a vertical and an inclined edge, one of said members having oppositely directed flanges on said edges and the other member having a flange on its inclined edge, said members being secured together to leave the flanges of the inclined edges in spaced parallel relation, and clamping means carried by the bracket on the same side as the flange on the vertical edge and cooperating therewith, said clamping means including an L-shaped member pivotally and slidably mounted on the bracket and having means to hold it in adjusted position, and a clamping screw passing through the L-shaped member.

11. In a device of the kind described, a bracket formed of two sheet metal members each of which has a vertical and an inclined edge, one of said members having oppositely directed flanges on said edges and the other member having a flange on its inclined edge, said members being secured together to leave the flanges of the inclined edges in spaced parallel relation, one of the parallel flanges having an extension at its lower end extending across the space between the parallel flanges, and clamping means carried by the bracket on the same side as the flange on the vertical edge and cooperating therewith.

12. In a device of the kind described, a bracket formed of two sheet metal members each of which has a vertical and an inclined edge, one of said members having oppositely directed flanges on said edges and the other member having a flange on its inclined edge, said members being secured together to leave the flanges of the inclined edges in spaced parallel relation, one of the parallel flanges having an extension at its lower end extending across the space between the parallel flanges, and clamping means carried by the bracket on the same side as the flange on the vertical edge and cooperating therewith, said clamping means including an L-shaped member pivotally and slidably mounted on the bracket and having means to hold it in adjusted position, and a clamping screw passing through the L-shaped member.

In testimony whereof he affixes his signature.

ANTON MATTSON.